REMOTE TELEMETERING AND RECORDING SYSTEM

Original Filed Feb. 18, 1958 2 Sheets-Sheet 1

INVENTOR:
ROBERT H. KOLB
BY: James Todorovic
HIS ATTORNEY

REMOTE TELEMETERING AND RECORDING SYSTEM

Original Filed Feb. 18, 1958 2 Sheets-Sheet 2

INVENTOR:
ROBERT H. KOLB
BY James Todorovic
HIS ATTORNEY

United States Patent Office

Re. 25,209
Reissued July 24, 1962

25,209
REMOTE TELEMETERING AND RECORDING SYSTEM

Robert H. Kolb, Houston, Tex., assignor to Shell Oil Company, a corporation of Delaware Original No. 3,007,134, dated Oct. 31, 1961, Ser. No. 715,893, Feb. 18, 1958. Application for reissue Mar. 5, 1962, Ser. No. 179,280
6 Claims. (Cl. 340—18)

Figure 1:
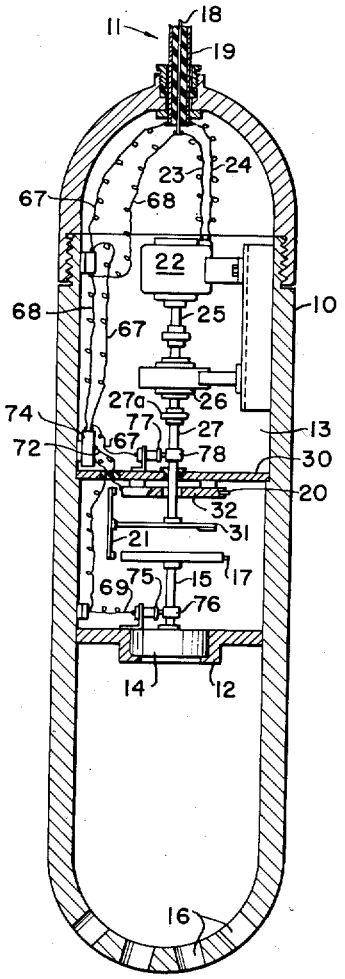

Matter enclosed in heavy brackets [ ] appears in the original patent but forms no part of this reissue specification; matter printed in italics indicates the additions made by reissue.

This invention relates to the measurement and recording of variable physical conditions or quantities, and pertains, more particularly, to telemetering systems for displaying and/or recording at a convenient place, e.g. the surface of the ground, indications which comprise a measure of a condition or a quantity in a difficult accessible place, such, for example, as a subsurface condition in a borehole, in an oil or gas well, or below a body of water.

In numerous industrial applications and particularly in the exploration and the production of oil and gas from subsurface reservoirs, a knowledge of subsurface conditions is often of great and even essential importance to the operator.

While, in the past, devices and systems have been developed for measuring such conditions, the systems heretofore employed and the records obtained thereby have been unsatisfactory for many reasons, such, for example, as the lack of a record which may quickly and easily be interpreted at the surface of the ground while measurements of subsurface conditions are being made, the lack of a truly precise measurement whereby small variations in a condition can be determined from the record and, in some systems, the inability of systems used heretofore to operate satisfactorily and without attendance over long periods of time.

The above deficiencies, e.g. lack of precision, etc., heretofore existed particularly in oil well telemetering systems which normally employ a calibrated chart on which indications relating to the value of a condition are recorded at the surface of the ground during the operation of the system.

For example, in one such type of telemetering system the subsurface apparatus comprised a fixed reference contact, a condition responsive device having a rotatable shaft carrying an indicator contact, and a rotatable sweep contact. A change in the condition being measured caused the device to effect a proportional angular displacement between the indicator and reference contacts. This displacement was cyclically converted into an interval comprising a measure of the condition by the sweep contact which successively contacted the indicator and reference contacts once each revolution to produce two electric pulses or signals which defined the interval and which were transmitted by a cable to recording apparatus at the surface of the ground.

The recording apparatus employed heretofore comprises a chart, for example, a cylinder of paper carried by a drum which is rotated in synchronism with the sweep contact, and a marking element which is moved parallel to the axis of the cylinder at a fixed rate of travel. In operation, the drum and marker element comprise the terminals of an electrical circuit between which a spark is caused to pass for marking the paper whenever an electric pulse is initiated by the subsurface contacts. By calibrating the recording apparatus and providing the chart with an ordinate axis it is possible to obtain a record which provides a log of the subsurface condition during the time required by the marking element to move axially across the recording paper or cylinder.

It will be appreciated that such data is difficult for interpertation, particularly when it is desired to measure small variations in the subsurface condition where the variations are indicated only by the difference in spacing between pairs of marks on a chart. It may be seen that the preciseness of the data is limited by the number of graduations which it is practical to provide on the chart for unitizing the space between the marks. Moreover, such systems cannot be employed over long periods of unattended operation since the chart must be changed frequently, for example, in the present case whenever the marking element has moved once axially across the recording paper or cylinder.

An object of this invention is therefore to provide a telemetering system particularly adapted for measuring subsurface conditions and providing at the surface of the ground indications which are a numerical measure of a subsurface condition, whereby these indications may be readily and accurately interpreted at the ground surface without employing the services of an expert.

Another object is to provide a telemetering system whereby more precise and accurate measurements can be obtained at the surface of the ground than was heretofore possible, particularly in the case of telemetering systems used in oil and gas wells.

Yet another object is to provide a telemetering system which is adapted for use over long periods of uninterrupted and unattended operation.

These and other objects and advantages may be attained, according to the present invention, by a subsurface apparatus which includes a new and improved arrangement of the subsurface contacts previously described, which contacts, together with the electrical circuitry of the present system, cyclically initiate two electric control pulses defining a time interval having a duration proportional to the value of the condition being measured. These pulses are employed to open and close an electric counter gate for applying a series of electric signals, for example, electric pulses having a fixed and specific high recurrence frequency with respect to the r.p.m. of the sweep contact, to a counter whereby the number of pulses counted during each cycle constitutes an extremely precise measure of the condition. The counter comprises part of the surface apparatus and is adapted to display the count made each cycle, which count may also be recorded at the surface of the ground.

While, broadly speaking, it is conventional to indicate the value of a variable condition by a pulse-telemetering system in which a shaft rotation converted into a number of electric pulses proportional to the angle of rotation, the systems which employed this approach heretofore have not, insofar as is known, been of a construction satisfactory for measuring subsurface conditions such, for example, as in a borehole or in an oil or gas well. For example, these systems are not adapted for dependable operation where a single-conductor type well-logging cable is used to connect the surface and the subsurface apparatus as is preferably the case in the present invention. Such a "pulse-telemetering" procedure comprises cyclically moving a sweep along a path corresponding to the path over which a displaceable element is displaced, producing a pulse for each significant increment of the sweep travel, signaling the moments at which the sweep positions correspond to those of a reference point and the displaceable element, and counting the number of pulses produced between the signals. The previously employed pulse-telemetering systems use a sweep and a pulse-producing device which are mechanically linked to a common shaft, and position signaling means comprising conductive elements arranged to cause a capacitance surge when the sweep positions correspond to those of a reference point and displaceable element.

In connection with well logging operations, the continuous transmission of the electrical pulses from a subsurface measuring unit would necessitate the use of a multiconductor well logging cable and/or batteries, amplifiers, or the like temperature-sensitive components. If the pulse-producing device is powered from a surface source, the power current, the signals indicative of the sweep positions, and the pulses, comprise three signals that must be simultaneously conveyed in a manner in which they can be separately utilized. If a displacement of less than a 360° rotation of a displaceable element is to be swept several times a minute and represented by a series of electrical pulses that number in the thousands, the pulses necessarily comprise a high-frequency fluctuating electrical signal and their transmission from a remote location involves the attenuation and intermingling problems inherent in conveying a high frequency over an extended transmission line. Both the multi-conductor cables and the temperature-sensitive components have inherent disadvantages in connection with systems to be employed within wells.

Accordingly, still another object of this invention is to provide a new and improved telemetering system giving highly accurate and precise measurements and particularly adapted for dependable operation with a single-conductor type well-logging cable which is employed to connect electrically the surface and the subsurface apparatus of the system.

A single-conductor well logging cable comprises an insulated wire surrounded by a conductive metal armor which armor usually consists of two or more layers of steel strands which provide strength and mechanical protection as well as a return path for the electrical circuit. Such a cable provides two electrical conductors, the wire and the ground return, and is uniquely adapted for use in wells where it is often necessary that the cable be bent around sheaves and squeezed through high-pressure lubricating devices into boreholes having internal pressures ranging from one to several thousand pounds per square inch.

A further object of the present invention is to provide a pulse-telemetering system in which the series of pulses that correspond in number to the quantities measured are produced at a convenient location, rather than at a remote location.

In the preferred embodiment of the present system the electric pulses which are applied to the counter are produced by pulse-generating means preferably arranged at the surface of the ground, whereby the recurrence frequency can be selected as desired and more precise measurements can be obtained than was heretofore the case. This preferred embodiment eliminates the necessity of amplifying the pulses and transmitting them from the remote to the convenient location, and enables the operator to select, for example, either a pulse-producing device which produces one thousand, or even several thousand, pulses per revolution of the sweep. Further, the surface and subsurface apparatuses are electrically connected by a single conductor type well logging cable which comprises part of a control circuit of the present system and which with the counter gate and the subsurface contacts operates to start transmission of electric pulses to the counter only in response to a certain one of the electric control signals initiated during each revolution of the sweep contact and to stop said transmission only in response to the other control signal. Thus, although a single conductor type cable is employed, the present system makes it possible to discriminate between control signals so that the count will always begin when the sweep contact closes with the proper subsurface contact thereby ensuring dependable and accurate operation of the system.

Figure 2:
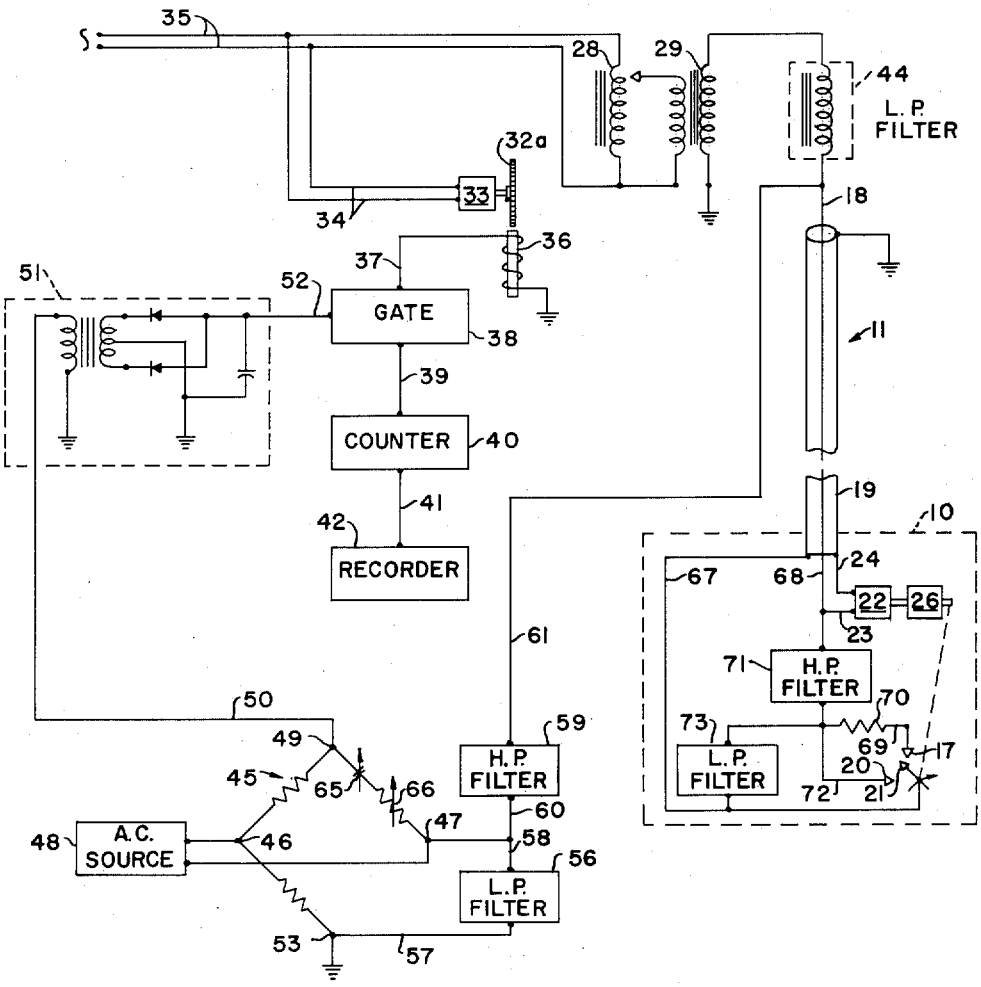

The present invention will be understood from the following description taken with reference to the attached drawings wherein:

FIGURE 1 is a vertical section taken through an embodiment of the subsurface apparatus of the present system; and FIGURE 2 is a schematic diagram of the electrical circuit of the present system.

Referring now to FIGURE 1, the subsurface apparatus of the present system comprises a substantially cylindrical housing or casing 10, which, at its upper end, is secured by a fluid and pressure-tight connection to a cable 11 which electrically connects the surface and subsurface apparatus and by means of which the housing is moved through or suspended in a borehole. Since it is frequently necessary to determine bottom hole conditions in a producing well, the casing 10 is preferably small enough to pass through production tubing and may be, for example, six feet long and one or two inches in outer diameter. Disposed within the casing is a partition 12 which with a device 14 (subsequently described) and the upper part of the casing defines a substantially fluid and pressure-tight chamber 13 in which the remainder of the subsurface apparatus is arranged, while the lower end of the casing 10 contains apertures, as indicated.

The device 14 may comprise any suitable condition responsive device such, for example, as a pressure responsive Bourdon-tube having a rotatable shaft 15 disposed within the chamber 13. The underside of the Bourdon-tube is disposed exteriorly of the chamber 13 and is subjected to pressure through a plurality of openings 16 provided in the bottom of the casing 10. As is well known, the operation of the Bourdon-tube is such that variations in pressure cause it to expand or contract and vary the angular position or displacement of the shaft 15 in proportion to the pressure. Thus, the pressure in a borehole can be measured and indicated at the surface of the ground by determining the angular displacement of the shaft 15 with respect to a fixed reference point. To this end the subsurface apparatus includes: (a) an indicator contact 17 which is fixed to the shaft 15 and rotates therewith; (b) a reference contact 20 which is fixed with respect to the contact 17 in a position to indicate, for example, the zero pressure position of the contact 17; and (c) a rotatable sweep contact 21. The reference contact 20 is preferably positioned away from the zero position of the indicator contact 17 by an amount such that the duration of the contact closure does not overlap any of the advance of the sweep along a path corresponding to the path over which the indicator element has been displaced. These contacts are preferably of the mechanical metal-to-metal type, and have contact surfaces disposed so that, as the sweep contact is rotated about the axis of the shaft 15, it cyclically closes with and makes a good electrical contact with the indicator and reference contacts 17 and 20, respectively, once during each revolution. Furthermore, the subsurface apparatus includes a motor 22 of the alternating current synchronous type, having a shaft 25 which operates a speed reduction gear unit 26. The slow speed shaft 27 connected to the unit 26 by a universal joint 27a, is journaled in a transverse member 30 in axial alignment with the shaft 15 and is attached to an arm 31 which carries the sweep contact 21 for rotating it about the axis of the shaft 15. The reference contact 20 may be carried for example, by a bracket 32 which depends from the member 30 and is provided with an opening through which the shaft 27 extends. As shown in FIGURE 1, the arrangement is such that the indicator contact 17 can rotate completely through 360°.

It is understood that the subsurface apparatus of the invention is not limited to the particular embodiment thus far described but may be varied to meet different operating conditions. The contacts 17, 20, and 21 may, for example, comprise any suitable means, such as variable capacitance type contacts or, alternatively, an arrangement using light energy, or optical or photoelectric means may be employed for determining the angular displacement of the shaft 15 with respect to a fixed reference point. Also, the sweep and indicator contacts 21 and 17, respectively, need not move in circular paths, and the path through which the sweep contact 21 moves may be different from that of the contact 17, so long as the paths are parallel or otherwise proportional.

Also, the size of the casing 10, for example, may be varied as required, and the condition responsive device 14 may be one of many known in the art for detecting many other physical conditions in a bore hole, such, for example, as temperature; the nature, composition, viscosity or salinity of the borehole fluid; the flow rate of the fluid; the points of entry of a contaminating fluid; the spontaneous potentials appearing at the junction of different fluid phases; the variations in the value of the force of gravity occurring with changes of depth, etc. Although only some of the subsurface conditions listed above are of strictly a physical nature while others are more of a chemical nature, the term "physical condition" is broadly applied for the purposes of this disclosure to cover any type of subsurface conditions to be measured. In addition, it will be appreciated that variations in the condition being measured need not be directly translated into rotational motion or displacement by means such as the Bourdon-tube previously described. The variations may, for example, cause a linear displacement of an element, such as a plunger, which linear motion may then be converted into rotational motion by various mechanical means such as described in "Mechanical Movements, Devices and Appliances," by G. D. Hiscox, Norman V. Henley Publishing Company, New York, 1921.

At the surface of the ground, the cable 11 is connected to circuitry including pulse counting means, e.g. as a digital counter, and to a suitable A.C. source for energizing the motor 22. Also, the system includes a pulse generator for producing pulses having the same periodic recurrence for each revolution of the contact 21; and a gate between the pulse generator and the counter. The pulse generator may be of any suitable type such, for example, as a pulse initiating element comprising a tape or a rotatable drum on the surface on the periphery of which a series of electric or electrostatic pulse initiating marks have been electrically, magnetically, mechanically, or optically impressed such that when each mark passes a suitable electrostatic, magnetic, mechanical or optical pickup device, as the case may be, an electric pulse appears at the output of the pickup device. The pulse initiating element can be driven or moved through any suitable path so long as it is parallel or otherwise proportional to the paths moved through by the sweep and indicator contacts 21 and 17. For practical reasons the pulse generator preferably comprises a rotatable gear, and a magnetic pickup including a permanent magnet wound with a coil, one end of which is grounded and the other or output end of which is connected to the gate. As the gear is rotated, each tooth passes through the magnetic field of the pickup device thereby causing the flux to change with respect to the coil to generate an electric pulse which appears at the output of the pickup device.

Finally, the system is provided with suitable circuitry such that in operation of the part of the system thus far described the reference contact 20 and the indicator contact 17 constitute two control points for the counter gate, whereby as the sweep contact closes with these contacts, two control signals are generated, one of which opens the gate for applying the output of the magnetic pickup to the digital counter and the other of which closes the gate to break the circuit between the magnetic pickup and the counter. Thus, the number of pulses counted by the counter is a numerical measure of the position of the indicator contact 17 with regard to the reference contact 20 and is therefore a measure of the pressure acting on the element 14.

In the preferred embodiment of the present invention, wherein the surface and the subsurface apparatus are electrically connected by a single conductor cable, the pulse generator is operated at the surface of the ground and the pulse gear is rotated in synchronism with the sweep contact 21 by a synchronous motor energized from the same A.C. source as the motor 22. Thus, the pulse gear is rotated in synchronism with the sweep contact 21. The rate of pulses may be varied by changing the speed ratio in the linkage between the motor and the pulse-producing device, e.g. gear 32a, by means of a positive drive linkage to insure a fixed ratio, or by changing the number of impulse-initiating marks on the gear 32a. The pulse gear and the sweep contact remain synchronized and the accuracy of the system is maintained despite variations in line current since the motors are energized from the same A.C. source and are equally affected by such variations. The terms "in synchronism" or "synchronized" are used herein to denote a condition wherein the pulse gear rotates at a speed which is equal to or stands in a fixed ratio to the speed of the sweep contact 21.

Because of this synchronism, the pulses and the power line signal amount to two interrelated fluctuating electrical signals having respectively high and low frequencies which differ by a substantially fixed amount. The unit comprising the surface-located synchronous motor and the surface-located motor-driven pulse-producing device may therefore be replaced by: (a) a high frequency oscillator which is adapted to produce a relatively high frequency signal (e.g. 5 kilocycles) and which is employed in association with a frequency divider which is arranged to produce interrelated relatively low signal having a frequency (e.g. 50 cycles per second) suitable for operating a synchronous motor; or (b) a frequency multiplier arranged to multiply a power-line frequency (e.g. 60 cycles per second) suitable for operating a synchronous motor to an interrelated relatively high frequency signal (e.g. 6 kilocycles). Since the subsurface synchronous motor is driven in the present system by the relatively low frequency signal, the motor rotates at a rate corresponding to this frequency so that each fluctuation of the low frequency signal corresponds to substantially the same relatively large increment of the travel of the sweep driven by the motor, and each fluctuation of the high frequency signal corresponds to substantially the same increment of the sweep travel.

The counter gate is arranged at the surface of the ground, and the system is provided with a control circuit and a gating circuit whereby the gate can open only in response to a distinctive control signal generated when the sweep contact 21 closes with one of the contacts 17 or 20, and can close in response to a like or different distinctive control signal generated when the contact 21 closes with the other contact. It may be seen that in the present system if the single conductor of the cable which electrically connects the surface and the subsurface apparatus was connected to a gate which sequentially opened and closed in response to consecutive and indistinct control signals initiated by the subsurface apparatus, the omission of one control signal during a revolution of the sweep contact would exactly reverse the function of the succeeding control signals, and the counter would be gated to count the number of pulses equivalent to the complement of the angular displacement of the contact 17 previously measured. The counter would continue to be gated in this manner until the omission of another single control signal restored the proper function of the control signals. In such a case, it may be impossible to distinguish the erroneous data from the valid data which is displayed and/or recorded at the surface of the ground. The arrangement of the present invention makes it possible to discriminate between control signals and thus ensures that the count will always begin when the sweep contact closes with the proper subsurface contact.

Referring again to the drawings, the cable 11, which connects the surface and subsurface apparatus, comprises a single insulated conductor 18 and a conductive stranded armor sheath 19 which comprises part of the cable circuit. In the housing 10, one terminal of the synchronous motor 22 is connected to the conductor 18 by a lead 23 and the other terminal is connected to the sheath 19 and thus to ground by a lead 24.

At the surface of the ground, as shown in FIGURE 2, the pulse gear 32a is driven by a synchronous motor 33, the leads 34 of which are preferably connected across the line conductors 35 of any suitable A.C. source of, for example, about 110–120 volts and 50–60 cycles. Alternating current power is supplied to the cable circuit and thus to the motor 22 from the same A.C. source through an auto-transformer 28 and an isolation transformer 29 having a winding connected to ground at one end and connected at the other end to the cable conductor 18 through a choke 44. The auto-transformer (when used) is employed as a step-down transformer to provide a variable and desired low voltage. The transformer 29 isolates the power line circuit from the other circuitry of the system.

The output of the magnetic pickup 36 is applied by a conductor 37 to the counter gate 38 which is connected by a conductor 39 to the digital counter 40. A cable 41 connects the counter to a recorder 42.

The gate 38 in a preferred embodiment may comprise any suitable circuit which is biased so that it assumes one of two stable states in response only to one distinct control signal for opening and starting transmission of pulses from the output of the magnetic pickup 36 to the counter and assumes the other state in response to another distinct control signal for closing and stopping transmission of pulses to the counter. In addition the gating circuit is preferably of a type having a single input terminal whereby the said circuit is connected to the control circuit by a single conductor as subsequently described. The term "distinct" is used herein to describe electric signals having different characteristics, for example, different amplitudes, different polarity, etc., and the gate preferably employed with the control circuit of the present system is of a type which opens and closes in response to control signals of different distinct amplitudes. The terms "gate" and "gating circuit" are used herein to denote the complete circuit which is employed for gating the counter in response to control signals connected to the circuit by the conductor 52. For example, where the circuit comprises a trigger circuit which is connected to the conductor 52 for operating a device such as an amplifier whose gain is controlled by the trigger circuit, or diodes or saturable reactors for starting and stopping the transmission of pulses to the counter 40, the terms "gate" and "gating circuit" include both the trigger circuit and the device.

A particularly suitable type of control circuit which may be employed for opening and closing the gate comprises an impedance bridge 45 across the input terminals 46 and 47 to which there is connected an A.C. source 48 comprising an oscillator and power amplifier. The A.C. source 48 applies to the bridge a low voltage signal having a high frequency of, for example, 2.5 kc.

In this type of control circuit, the frequency of the signal applied through the bridge is selected so that (a) it can be filtered free of the motor driving current, and (b) it is a frequency to which the input impedance of the transmission line (e.g. cable 11) undergoes a significant change in response to changes in the impedance that exists between the far ends of the transmission line conductors in respect to a signal of the frequency of the control signal. Where it is feasible to employ bulky filtering devices, the control signal can be a direct current or a very low-frequency alternating current. However, in general, it is preferable to employ a control signal having a frequency which is significantly higher than the frequency of the motor-driving current. The selected frequency should, in any event, be chosen in respect to the properties of the transmission line so that the input impedance undergoes detectable changes in response to changes at the far end of the transmission line conductors that place the conductors in a substantially open-circuited or a substantially short-circuited condition. The selected frequency may be one to which the input impedance either increases or decreases when the far ends of the transmission line conductors are switched from an open-circuited to a short-circuited condition.

One bridge terminal 49 is connected by a conductor 50 to a detector circuit 51 comprising, for example, a full wave rectifier, the output of which is connected by the conductor 52 to the gate 38. The opposite terminal 53 is connected to ground and the terminal 47 is connected by conductors 58, 60 and 61 through a high pass filter 59 to the cable conductor 18 whereby the branch of the bridge between the terminals 53 and 47 is formed by the input impedance of the cable 11. A low-pass filter 56 is connected between the terminals 47 and 53 by conductors 57 and 58. The filter 59 provides a high impedance to the power line current passing to the bridge, while the filter 56 provides a low impedance path to ground for any power line current passing 59 so that power line voltage present at 47 is extremely small. The choke 44 comprises a low-pass filter preventing the high frequency signal from passing to the power line. The bridge may be balanced by adjusting the variable capacitor 65 and resistor 66, and is preferably balanced so that its output is zero when the contacts 17, 20 and 21 are open circuited.

Further, the arrangement is such that when the sweep contact closes with the contacts 17 and 20 the bridge is unbalanced to produce two output or unbalance signals of distinctly different amplitudes. More particularly, as shown in FIGURE 2, the sweep contact is preferably connected to the sheath 19 and is therefore grounded by a conductor 67, and one of the contacts, for example, the contact 17 is connected to the cable conductor 18 by a conductor 68 and a conductor 69 including a resistor 70 and a high pass filter 71. The remaining contact 20 is connected to the conductor 18 through the high-pass filter 71 by conductors 68 and 72. The high-pass filter 71 is connected between the motor 22 and the contacts 17, 20 and 21 to prevent the motor from being short circuited, and a low-pass filter 73 provides a high impedance signal path to ground for the low voltage high frequency signal from the source 48.

In operation of the system the motors 22 and 33 and thus the sweep contact 21 and the pulse gear 32a are synchronized so that the pulse generator produces the same number of uniformly spaced pulses for each revolution of the sweep contact. Preferably, the arrangement is such that the pulse frequency is relatively high with respect to the r.p.m. of the sweep contact. A pulse frequency of, for example, 42, 300 pulses within the angular equivalent of full-scale deflection of the contact 17 giving a resolution of better than 0.0025% full scale has been found to provide the system with suitable precision.

While the sweep contact 21 may be rotated in either direction, it is preferably rotated clockwise when the resistor 70 is serially connected to the indicator contact 17 as shown in FIGURE 2. The operation of the control circuit is briefly as follows. As the sweep contact 21 rotates it cyclically closes once each revolution with the contacts 20 and 17 which comprise two control points for the system. When the sweep contact closes with the reference contact 20 the cable is essentially short circuited to the high frequency signal from the source 48 and the bridge 45 is caused to produce a relatively high amplitude unbalance signal which is converted by the detector circuit 51 to a square D.C. control signal of a corersponding amplitude for causing the gate 38 to open and apply the output of the pulse generator to the counter 40. The counter continues to accept these pulses until the sweep contact closes with the indicator contact 17 which connects the resistor 70 into the cable circuit thereby producing a loaded condition and causing the bridge to produce an unbalanced signal of a lower amplitude. Similarly, this signal is converted by the detector circuit to a square D.C. control signal of a correspondingly lower amplitude for closing the gate and stopping the counter.

It is understood that the control and gate circuitry may be varied in numerous ways, for example, if it is desired to rotate the sweep contact in a counter-clockwise direction, the control and gate circuits may be employed in the same manner by connecting the resistor 70 in series with the reference contact 20. If one of the control signals is omitted the gate will remain in either a closed or open condition until that control signal is again generated. In the former circumstance no count will be made by the counter, and in the latter circumstance the count will be so obviously at variance from the valid data as to be easily distinguishable therefrom.

At the end of a count in any one revolution of the sweep contact 21, the counter 40 displays the final count for a short period and is reset automatically to zero before the next revolution of the sweep contact. Also, the system may include a suitable print out circuit, preferably comprising part of the counter, which operates the recorder to, for example, print the count for each revolution of the sweep contact on a paper tape. Finally, if desired, the system can be provided with suitable apparatus for recording on the tape the time and the depth at which each count was recorded.

The resistor 70 and the filters 71 and 73 are preferably arranged in a compartment 74 (FIGURE 1) which is attached to the housing 10. As shown in FIGURE 1, the indicator contact 17 is electrically connected to the conductor 69 through the shaft 15 by a brush 75 and slip ring 76. Another embodiment of this portion of the structure includes the use of a hairspring contactor in place of brush 75 and slip ring 76. In the embodiment shown in FIGURE 1 the sweep contact 21 is electrically connected to the conductor 67 through the arm 31 and shaft 27 by a brush 77 (grounded through bearing system) and slip ring 78, and the conductor 72 is electrically connected to the bracket 32 and thus to the contact 20. Finally, the bracket 32 and the shaft 15 are electrically insulated from the casing 10, while shaft 27 is not insulated being connected to cable 19 through case.

The foregoing description has been given for clearness of understanding only, and no unnecessary limitation should be implied therein or inferred therefrom, for it will be apparent to those skilled in the art that variations and changes may be made in the present system without departing from the spirit and scope of the appended claims.

I claim as my invention:

1. A system for measuring at a convenient location the value of a variable physical condition at a remote location comprising a remote instrument having a rotatable indicator contact, a reference contact fixed with respect to said indicator contact, means responsive to the value of the condition for angularly displacing the indicator contact with respect to the reference contact, a rotatable sweep contact, means for rotating the sweep contact whereby said contact cyclically closes with the reference and indicator contacts once for each revolution of the sweep contact, a convenient instrument having pulse generating means producing pulses having substantially the same periodic recurrence frequency for each revolution of the sweep means said remote and convenient instruments being coupled together by a cable, pulse counting means, a control circuit including said cable, said cable being short circuited when said sweep contact closes with one of the other contacts to produce a first unbalanced condition in said control circuit and [open circuited] *electrically loaded* when the sweep contact closes with the second of the other contacts to produce a second unbalanced condition in said control circuit, gating means connected between said pulse counting means and the pulse generating means and adapted to open only in response to one of the unbalanced conditions and adapted to close only in response to the other of the unbalanced conditions, and means connecting the output of said control circuit to said gating means.

2. A system for measuring at a convenient location the value of a variable physical condition at a remote location comprising a remote instrument having a rotatable indicator contact, a reference contact fixed with respect to said indicator contact, means responsive to the value of the condition for angularly displacing the indicator contact with respect to the reference contact, a rotatable sweep contact, first synchronous motor means for rotating the sweep contact whereby said contact cyclically closes with the reference and indicator contacts once for each revolution of the sweep contact, a convenient instrument having a rotatable pulse generator producing a predetermined number of pulses during each revolution of the pulse generator, second synchronous motor means energized by the same alternating current as said first synchronous motor means for rotating said pulse generator at a speed synchronized with the rotation speed of said sweep contact, pulse counting means, said remote and convenient instruments being coupled together by a cable, a control circuit including said cable, said cable being short circuited when said sweep contact closes with one of the other contacts to produce a first unbalanced condition in said control circuit and [open circuit] *electrically loaded* when the sweep contact closes with the second of the other contacts to produce a second unbalanced condition in said control circuit, gating means connected between said pulse counting means and the pulse generating means and adapted to open only in response to one of the unbalanced conditions and adapted to close only in response to the other of the unbalanced conditions, and means connecting the output of said control circuit to said gating means.

3. A system for measuring the displacement value of a displaceable element, which system comprises: a rotatably displaceable element, a source of low frequency fluctuating electrical power, means for producing a high frequency fluctuating electrical signal, the frequency of the high frequency electrical signal differing from the lower frequency power by a substantial and fixed amount; a rotatable sweep contact; means for cyclically advancing the sweep through a path corresponding to a path over which the displaceable element is displaced at a rate corresponding to the frequency of the relatively low frequency power so that each signal fluctuation corresponds substantially to the same increment of the sweep travel; means associated with the sweep for producing first and second position-marking signals at the moments at which the sweep positions recurrently correspond to the position of a reference point and the position of the displaceable element said first and second position-marking signals having distinctively different electrical properties; and switching and counting means associated with the high frequency signal and the position-marking signals with the switching means arranged to admit the high frequency signal to the counting means during a selected interval between the position-marking signals so that the counter counts the fluctuations which occur in the signal during that interval.

4. A system for measuring the value of a variable subsurface condition comprising a housing, a rotatable indicator contact in said housing, a reference contact in said housing and fixed with respect to said indicator contact, means carried by said housing responsive to the value of the condition for angularly displacing the indicator contact with respect to the reference contact, a rotatable sweep contact in said housing, means in said housing for rotating the sweep contact whereby said contact cyclically closes with the reference and indicator contacts once for each revolution of the sweep contact, pulse generating means producing pulses having substtantially the same periodic recurrent frequency for each revolution of the sweep means, pulse counting means, a control circuit including a normally balanced impedance bridge; a source of high frequency alternating current coupled to said bridge; said bridge in addition being coupled to said reference and indicator contacts by a simple conductor cable, said bridge in addition producing distinctively different states of unbalance when said sweep contact closes on said indicator and said reference contacts respectively, gating means connected between said pulse counting means and the pulse generating means and adapted to open only in response to one of the bridge unbalance signals and adapted to close only in response to the other of the bridge unbalance signals, and means connecting the output of said signalling circuit to said gating means.

5. A telemetering system for measuring the value of a variable physical condition in a borehole comprising subsurface apparatus including a housing movable through a borehole and having a fluid tight chamber, a rotatable indicator contact in said chamber, a reference contact fixed with respect to said indicator contact and disposed in said chamber, means carried by said housing responsive to the value of the condition for angularly displacing the indicator contact with respect to the reference contact, a rotatable sweep contact in said chamber, first synchronous motor means in said chamber for rotating the sweep contact whereby said contact cyclically closes with the reference and indicator contacts once for each revolution of the sweep contact, a single conductor type electrical cable connecting said subsurface apparatus with surface apparatus including a rotatable pulse generator for producing a predetermined number of pulses during each revolution of the pulse generator, second synchronous motor means energized by the same alternating current as said first synchronous motor means for rotating said pulse generator at a speed synchronized with the rotation speed of said sweep contact, pulse counting means, a normally balanced impedance bridge circuit, electrical circuit means including said cable for connecting the contacts in the chamber and the bridge circuit whereby when the sweep contact closes with the indicator contact the bridge circuit is caused to produce a first unbalanced signal and when the sweep contact closes with the reference contact the bridge circuit is caused to produce a second different unbalance signal, a detector circuit for converting said unbalance signals into two distinct control signals, gating means connected between said pulse counting means and the pulse generating means and adapted to open only in response to one of said control signals and to close in response to the other, and means connecting the control signals to said gating means.

6. A telemetering system for measuring the value of a variable physical condition at a remote location comprising: an apparatus at the remote location and an apparatus at a convenient location, said remote and convenient apparatus being electrically interconnected by a single conductor cable having a ground return; a first alternating current power source coupled to said single conductor cable; said remote apparatus including means for rotating an indicator contact by an amount proportional to the value of the variable condition, a reference contact and a rotatable sweep contact for cylically contacting said indicator and reference contacts, a synchronous motor for driving said sweep contact; said convenient apparatus including a pulse producing means for producing a predetermined number of pulses for each cycle of said first alternating current source, a pulse counting means, gate means to control the application of pulses to the counter means; a control circuit at the convenient location including a normally balanced impedance bridge, a second source of alternating current [having a] coupled to said bridge and having a high frequency compared to the frequency of said first source, said bridge *being* coupled to said single conductor cable; said bridge exhibiting distinctively different unbalance conditions change as said sweep contact passes said indicating and said reference contacts; alternating current being coupled to said control circuit to cause said control circuit to produce pulses for opening and closing said gate as said rotating contact passes said indicating and reference contacts.

References Cited in the file of this patent or the original patent

UNITED STATES PATENTS

| | | |
|---|---|---|
| 2,390,409 | Aiken | Dec. 4, 1945 |
| 2,679,757 | Fay | June 1, 1954 |
| 2,680,241 | Gridley | June 1, 1954 |
| 2,730,698 | Daniels | Jan. 10, 1956 |
| 2,734,188 | Jacobs | Feb. 7, 1956 |
| 2,768,684 | Castel | Oct. 30, 1956 |